United States Patent
Vaarala et al.

(10) Patent No.: US 6,866,879 B1
(45) Date of Patent: Mar. 15, 2005

(54) METHOD OF PROCESSING A PROTEINOUS MATERIAL, A PRODUCT SO OBTAINED, AND USE THEREOF

(75) Inventors: Outi Vaarala, Helsinki (FI); Olli Tossavainen, Espoo (FI); Outi Kerojoki, Helsinki (FI); Kari Salminen, Helsinki (FI); Marika Eriksson, Helsinki (FI)

(73) Assignee: Valio Ltd., Helsinki (FI)

( * ) Notice: Subject to any disclaimer, the term of this patent is extended or adjusted under 35 U.S.C. 154(b) by 0 days.

(21) Appl. No.: 09/806,324

(22) PCT Filed: Sep. 29, 1999

(86) PCT No.: PCT/FI99/00800

§ 371 (c)(1),
(2), (4) Date: May 29, 2001

(87) PCT Pub. No.: WO00/18251

PCT Pub. Date: Apr. 6, 2000

(30) Foreign Application Priority Data

Sep. 30, 1998 (FI) ................................................. 982114

(51) Int. Cl.[7] .................................................. A23C 7/00
(52) U.S. Cl. ........................ 426/580; 426/491; 426/656; 426/657
(58) Field of Search ................................. 426/478, 490, 426/491, 580, 583, 587, 588, 656, 657

(56) References Cited

U.S. PATENT DOCUMENTS

| | | |
|---|---|---|
| 4,976,865 A | 12/1990 | Sanchez et al. |
| 5,663,291 A | 9/1997 | Obermeier et al. |

FOREIGN PATENT DOCUMENTS

| | | |
|---|---|---|
| EP | 0 284 525 | 9/1988 |
| EP | 0 601 802 | 6/1994 |
| FI | 94088 | 7/1995 |
| FI | 94089 | 7/1995 |
| FI | 971872 | 10/1998 |
| WO | WO98/48640 | 11/1998 |

OTHER PUBLICATIONS

Dialog Information Services, File 155, Medline, Dialog accession No. 0943012, Medline accession No. 98156374, Vaarala O. et al.: "Cow milk feeding induces antibodies to insulin in children—a link between cow milk and insulin–dependent diabetes mellitus?" Scand J Immunol (England), Feb. 1998, 47 (2), p. 131–5.

*Primary Examiner*—Leslie Wong
(74) *Attorney, Agent, or Firm*—Nixon & Vanderhye P.C.

(57) ABSTRACT

The invention relates to a method of removing bovine insulin from a liquid fat-free proteinous material originating from cow's milk, wherein the liquid fat-free proteinous material originating from cow's milk, the material having a pH of 2 to 8, at a temperature below 65° C., is contacted with an adsorption resin, whereby the weight ratio of the proteinous material to be treated to the adsorption resin is at most 100:1, optionally combining with said resin treatment at least one ultra and dia-filtration treatment of the proteinous material, and, if necessary, the liquid material so obtained is concentrated into a protein concentrate and optionally dried to powder. The invention further relates to a substantially bovine insulin-free proteinous material so obtained, and to its use as the protein part or raw material in the preparation of substantially bovine insulin-free infant formulae or other special nutritive preparations or consumption milk, other milk drinks or other milk preparations, or as a raw material therein.

24 Claims, No Drawings

METHOD OF PROCESSING A PROTEINOUS MATERIAL, A PRODUCT SO OBTAINED, AND USE THEREOF

The invention relates to a method of processing a proteinous material more exactly to a method of removing bovine insulin from a liquid fat-free proteinous material originating from cow's milk. The invention also relates to a substantially bovine insulin-free proteinous material produced by said method, and to its use as the protein component of infant formula or another special nutritive preparation or as the raw material in consumption milk, other milk drinks or different milk preparations. In the production of said products, the substantially bovine insulin-free, fat-free proteinous material, which originates from cow's milk and is produced by said method, can be used as the protein component.

The substantially bovine insulin-free, fat-free proteinous material, preferably whey, which originates from cow's milk and is obtained in accordance with the invention, is an optimally suitable protein component in the above products, because the processing according the invention does not substantially alter the taste of the product.

Insulin-dependent diabetes mellitus (IDDM) is a disease caused by destruction of the insulin-producing beta cells in the Langerhans islets of the pancreas, while other cells in the islets remain intact (Castano L. and Eisenbarth G S, Annu. Rev. Immunol, 8 (1990) 647–79 ).

Both genetic and environmental factors are believed to affect the risk of children contracting IDDM. The genetic factor is important, but not sufficient to explain the development of IDDM. Lifetime risk of IDDM is only between 30 and 50% in one of monozygtic twins, if the other has IDDM. Only 10% of new IDDM cases occur in families having IDDM, and 90% of new cases are diagnosed in patients with no family history of IDDM. In other words, environmental factors may have an even more important significance than genetic factors in the development of IDDM.

Several epidemiological studies show that exposure to cow's milk protein in early infancy increases the risk of contracting IDDM (Gerstein H., Diabetes Care 17 (1994) 13–19). Epidemiological observations have been used to present several hypotheses concerning mechanisms in which cow's milk proteins could act as diabetogenic factors. One of the latest is a hypothesis according to which the insulin in cow's milk may cause an immune response which is erroneously directed against the child's own insulin production (Vaarala, C. Paronen, J. Otonkoski, T. Ákerblom, H. K., Scand. J. Immunol. 47 (1998) 131–135).

Orally administered heterologous insulin, slightly different from autologous insulin, may violate the immunologic tolerance against beta cells. The formation of insulin-identifying lymphocytes may be harmful in persons having a hereditary susceptibility to IDDM, and the activation of such a lymphocyte population may later in life result in an auto-immune attack against insulin-producing beta cells. We have shown that administering a formula to infants induces the production of antibodies to bovine insulin (Vaarala, O., Paronen, J., Otonkoski, T., Ákerblom, H. K., Scand. J. Immunol. 47 (1998) 131–135). These antibodies cross-react with human insulin. Since the presence of insulin auto-antibodies (IAA) precedes and predicts the outbreak of IDDM, immunization to insulin, caused by milk products may be harmful and increase the risk of contracting IDDM. Thus, milk products not containing immuno-reactive bovine insulin could be considered to be non-diabetogenic nutrients.

Should the factor activating auto-immunization be bovine insulin, which is present in small amounts in cow's milk, it is crucially important to remove it from infant formulae in order to prevent the outbreak of IDDM in children. Accordingly, there is a need for commercially available cow's milk products and cow's milk-based products that do not contain immunoreactive bovine insulin. This relates particularly to infant formulae, which are the first cow's milk-based products consumed by infants. Additionally, it relates to other special nutritive preparations and different milk drinks and milk products, such as ice-cream, yoghurt and cheese.

Furthermore, it would be desirable that the protein part used in the products did not substantially change their familiar taste.

We have previously shown that bovine insulin can be removed from a fat-free proteinous material originating from cow's milk, such as whey or skimmed milk, by means of cation exchange followed by optional hydrolysis and, after the hydrolysis, optional chromatographic treatment, which may be adsorption resin treatment, for example (Finnish patent application 971872). Our Finnish patent 94089 also discloses adsorption resin treatment of a protein hydrolysate.

Not it has been surprisingly found that bovine insulin can be removed from a liquid fat-free proteinous material originating from cow's milk, such as whey or skimmed milk directly by means of adsorption resin treatment. This new method removes bovine insulin more completely and economically than previously from said proteinous material.

The new method does not even require protein hydrolysis. This avoids the extra costs caused by the hydrolysis step and the change in taste caused by hydrolysis products. The hydrolysis products obtained are split proteins which change the familiar taste of the product to be produced. For instance milk, whose protein part is at least partly replaced by whey that is hydrolyzed and therefore contains split proteins, does not taste like milk. In contrast, milk, whose protein part is at least partly replaced by whey treated by the method of the invention and containing whole proteins, tastes substantially like milk.

Cow's milk usually contains small amounts of bovine insulin. The content varies depending on the assay method but contents of about 1 ng/ml have been detected by for example the ELISA method (Enzyme Linked Immuno Sorbent Assay) and the RIA method (Radio Immuno Assay).

In this invention, bovine insulin was assayed from samples by the RIA method. The sample solution was frost dried, dissolved in a concentrated solution and assayed by the RIA. The ELISA method was used as a second independent method, wherein the antibodies used were not the same as in the RIA method. The RIA analysis has to be performed before heat treatment to obtain reliable results. The RIA and ELISA methods gave results that were in the same order.

Liquid chromatography and a reversed phase column (Kroeff et al., J. Chromatogr. 461 (1989) 45–61; Poll and Harding, J. Chromatogr. 539 (1991) 37–45; Cox, J. Chromatogr. 599 (1992) 195–203; Welinder, J. Chromatogr. 542 (1991) 83–99), gel filtration or an anion exchange column (WO 90/00176 and WO 90/00177) or a weak cation exchange column (DE 3511270 A1 and GB 2173503 A) have usually been employed in the purification of insulin from production and extraction liquors. None of the publications have so far discussed direct separation of bovine insulin from skimmed milk or whey, except for our aforementioned Finnish patent application 971872. As such reversed phase or gel filtration chromatography is not suited to treating milk, since the milk treated should be suitable for foodstuffs and reasonably priced.

Insulin can be easily inactivated immunologically with heat treatment. For instance pasteurisation (72° C.) and ultra high treatment (UHT treatment 135–140° C.) inactivate the majority of the insulin into a form not detectable by the RIA. However, it has been noted that infants who have been given formulae, have gain immunization to bovine insulin through the formulae (Vaarala, O., Paronen, J., Otonkoski, T., Ákerblom, H. K., Scand. J. Immunol. 47 (1998) 131–135), in the production of which the majority of the insulin has become non-detectable by the RIA in the heating step.

The applicant has now discovered how to remove bovine insulin more efficiently than previously from liquid fat-free proteinous material originating from cow's milk. In this case a protein composition is obtained, by reasonable costs, which originates from cow's milk, is suitable for foodstuffs and is substantially free from bovine insulin and is as such suitable for use as the protein part in infant formula in particular, but also in other special nutritive preparations, or as the raw material in consumption milk, other milk drinks and various milk products, such as ice-cream, yoghurt or cheese, and which does not change their taste from what is familiar.

The method of the invention for removing bovine insulin from a liquid fat-free proteinous material originating from cow's milk is characterized by contacting the liquid fat-free proteinous material originating from cow's milk, the material having a pH of 2 to 8, at a temperature of less than 65° C., with an adsorption resin, whereby the weight ratio of the proteinous material to be treated to the adsorption resin is at most 100:1, optionally combining with said resin treatment at least one ultra and dia-filtration treatment of the proteinous material, and if necessary, concentrating the liquid material so obtained into a protein concentrate and optionally drying to powder.

The removal of fat and casein from milk results in whey containing the whey proteins. Of the total protein of milk, about 20 percent is whey protein and the rest is casein. The whey obtained in cheese production is called cheese whey and the whey obtained in casein production is in turn called casein whey.

The invention is best suited to the treatment of whey. The whey used in the invention may be any whey originating from cow's milk, such as cheese whey, rennet casein whey, acidic casein whey or sour cheese whey. The whey is preferably cheese whey.

The fat-free proteinous material originating from cow's milk can also be ultra and dia-filtrated whey, i.e. a whey protein concentrate. In this case the liquid volume to be treated with resin is smaller and the degree of bovine insulin removal is about the same as in whey treatment.

In addition to the above, skimmed milk or an aqueous solution made from fat-free milk powder or an aqueous solution made from milk casein i.e. a casein solution, can be used in the invention as the fat-free proteinous material originating from cow's milk. However, in this case the degree of bovine insulin removal is not in the same order as in whey treatment.

In accordance with the invention, bovine insulin is removed from a fat-free proteinous material originating from cow's milk, preferably from whey or a whey protein concentrate, by contacting the material to be treated with an adsorption resin. A styrene-based on acrylic-based adsorption resin that is preferably macroporous can suitably be used as the adsorption resin to which bovine insulin is bound. Suitable adsorption resins include Dowex XUS 40285.00 (pore size about 50 Å; manufacturer Dow Inc., Germany) and Amberlite XAD 7 (pore size between 450 and 500 Å; manufacturer Rohm & Haas, France).

Adsorption resin treatment can be carried out either by passing the proteinous material to be treated through a column filled with an adsorption resin, or by contacting said proteinous material with an adsorption resin in a mixing vessel. In adsorption resin treatment, the pH is 2 to 8, suitably 4 to 6.7, and the temperature below 65° C., usually 2 to 30° C., and suitably 2 to 10° C.

When adsorption resin treatment is carried out in a column, the column is filled with an adsorption resin, which is suitably regenerated with NaOH and HCl. The proteinous material to be treated is passed through a column, filled with the adsorption resin, at a flow rate of 1 to 20 column volumes (BV)/h, suitably at a flow rate 6 to 8 BV/h. The weight ratio of the proteinous material to be treated in said resin treatment to the adsorption resin is at most 100:1, suitably 10:1 to 40:1.

When adsorption resin treatment is carried out in a mixing vessel, the adsorption resin regenerated in the above described manner and the proteinous material to be treated are introduced into the mixing vessel in which they are contacted with each other under suitably mild mixing. The weight ratio of the proteinous material to be treated in said resin treatment to the adsorption resin is at most 100:1, suitably 10:1 to 40:1, and the duration of the contact is less than 2 hours, suitably 60 minutes.

At least one ultra and dia-filtration treatment of the liquid fat-free proteinous material originating from cow's milk can be combined with the above adsorption resin treatment. By ultra and dia-filtration the liquid material can be concentrated for drying or other further processing, but simultaneously the ultra and dia-filtration can be used to complete the removal of bovine insulin from the material to be treated. Semi-permeable 5,000 to 25,000 D cut-off membranes, suitably 10,000 D cut-off membranes are used in ultra and dia-filtration. Membrane materials suitable for ultrafiltration include polysulphone, polyethersulphone and hydrophilously coated materials.

The degree of insulin removal obtained by ultra and dia-filtration increases as the concentration ratio rises. An appropriate concentration ratio is selected for each particular case.

Whey or some other dilute starting material can be concentrated by the aforementioned ultra and dia-filtration into a whey protein concentrate or into another concentrated starting material, respectively, before the aforementioned adsorption resin treatment. On the other hand, the ultra and dia-filtration can be carried out after the aforementioned adsorption resin treatment, whereby a protein concentrate is obtained which can be dried into powder, suitably by spray or frost drying.

In the treatment of the starting material, the total concentration ratio may be e.g. about 24 (concentration ratio first 6 and then 4), but in the concentration of the material into a protein concentrate, the total concentration ratio may be e.g. about 120 (concentration ratio first 10 and then 12).

In a preferred embodiment of the method of the invention, ultra and dia-filtration is carried out before and/or after adsorption resin treatment.

Before contact with an adsorption resin, the liquid fat-free proteinous material originating from cow's milk, preferably whey, may be pretreated by clarifying it at a temperature below 65° C., suitably by microfiltration, ultra-filtration or centrifugation. Said pretreatment is preferably carried out by filtering the material to be treated through microfiltration membranes, the membranes being 0.05 to 1.4 micrometer membranes, preferably 0.1 micrometer membranes. In that case casein dust or denatured whey proteins, which optionally are present, and together with which is a part of the macromolecular proteins to which insulin is often bound, can be removed particularly from the whey. In ultrafiltration, in turn, membranes with a cut-off value of 50,000 to 200,000 D can be used, the speed of rotation in centrifugation being preferably between 1,000 and 10,000 rounds per minute.

Clarification treatment also slightly lowers the bovine insulin content of the material to be treated. The bovine insulin content of whey, for example, decreases by 6 to 10% in aforementioned clarification treatment.

In the most preferred embodiment of the invention, whey is treated by an adsorption resin and this resin treatment is combined with one ultra and dia-filtration treatment that is carried out either before or after the resin treatment. Studies showed that the above procedure resulted in the removal of bovine insulin from whey by treatment of cheese of casein whey with an adsorption resin, such as Dowex XUS 40285.00 (Dow Inc., Germany) or Amberlite XAD 7 (Rohm & Haas France). By running the whey at pH 2 to 8 through an adsorption resin regenerated with NaOH and HCl, the insulin was bound to the resin. The whey so treated was ultrafiltered at pH 6.5 to a whey protein concentrate which was evaporated and dried into powder. The treatment was also carried out by first ultra and dia-filtering the whey and then treating the obtained protein concentrate by the adsorption resin. In the treatment, the insulin content of the whey decreased from 21 to 3 ng/g protein, defined by the RIA, i.e. about 85% in proportion to the protein.

The whey treated in the above manner produced a whey protein preparation which, with regard to bovine insulin, was crucially purer than a corresponding conventional infant formula powder (about 22 to 30 ng/g protein), milk powder (about 30 ng/g protein) or ultra or dia-filtered whey protein powder (protein content 70 to 80%) (15 to 25 ng/g protein). The substantially bovine insulin-free whey protein preparation so obtained is suitable for use as the raw material and sole protein source in infant formulae, since, nutritionally, whey protein is of an extremely high quality and does not need other proteins to complete the nutritional value. Furthermore, the substantially bovine insulin-free proteinous material obtained according to the invention is suitable for use as the raw material and protein part in various special nutritional preparations, various milk drinks, such as consumption milk, and various other milk preparations, such as ice-cream, yoghurt and cheese.

Conventionally, infant formulae, the first cow's milk-based products consumed by infants, are composed of milk, cream, vegetable oil, low-salt whey powder, minerals and vitamins, of which milk, cream and low-salt whey powder contain bovine insulin.

The method of the invention allows a substantial reduction in the bovine insulin content in infant formulae and other cow's milk-based special nutritive preparations, milk drinks and other milk preparations, and in their raw materials.

The method of the invention for the preparation of a substantially bovine insulin-free infant formula or another special nutritive preparation or consumption milk, another milk drink or another milk preparation or their raw material is characterized by using a substantially bovine insulin-free fat-free proteinous material originating from cow's milk and prepared by the method of the invention as the protein part in the production of a product.

The invention will be described in greater detail in the following examples.

EXAMPLE 1

Removal of bovine insulin from whey with a macroporous styrene-based adsorption resin, Dowex XUS 40285.00 at pH 5.8.

XUS 40285.00 adsorption resin was regenerated with 2% NaOH+2% HCl, rinsed to neutral and packed in a 20-ml column. 20 column volumes (BV), i.e. 400 ml of fresh cheese whey was passed through the column at pH 5.8.

In the treatment, 45% of the bovine insulin was removed from the whey. The protein yield in the treatment was 93%, i.e. the insulin content decreased by 42% in proportion to the protein.

EXAMPLE 2

Removal of bovine insulin from whey with absorption resin XUS 40285.00 at pH values 4, 5.8 and 6.4.

XUS 40285.00 adsorption resin was regenerated with 2% NaOH+2% HCl and rinsed to neutral. 145 ml of cheese whey adjusted to a pH value of 4, 5.8 or 6.4 and 25 ml of resin were introduced into an Erlenmeyer flask placed in a shaker. After 60 minutes' shaking, the resin was separated from the whey and the bovine insulin content of the whey was assayed by the RIA.

In the treatment, 57% of the bovine insulin was removed at pH 4.0, 71% at pH 5.8 and 58% at pH 6.4. The protein yield was 69% at pH 4.0, 66% at pH 5.8 and 63% at pH 6.4, i.e. in proportion to the protein, the insulin content had decreased 39%, 47%, and 37%, respectively. The test shows that bovine insulin can be removed from whey by an adsorption resin within a wide pH range.

EXAMPLE 3

Removal of bovine insulin from whey with a macroporous acrylic-based adsorption resin, Amberlite XAD 7.

XAD 7 adsorption resin was regenerated with 4% NaOH+ 0.09% HCl, rinsed to neutral and packed into a 20-ml column. 20 column volumes (BV), i.e. 400 ml of fresh cheese whey was passed through the column at pH 6.4.

In the treatment, 76% of the bovine insulin was removed. The protein yield in the treatment was 90%, i.e. the insulin content had decreased 68% in proportion to the protein.

EXAMPLE 4

Removal of bovine insulin from a whey protein concentrate with adsorption resin XUS 40285.00 at pH 5.8.

XUS 40285.00 adsorption resin was regenerated with 4% NaOH+0.09% HCl, rinsed to neutral and packed into a 20-ml column. 20 column volumes (BV), i.e. 400 ml of a microfiltered (1.4 micrometers) whey protein concentrate (dry matter 5%, protein 32% of the dry matter) was passed through the column at pH 5.8. In the treatment, 46% of the bovine insulin was removed from the whey protein concentrate. The protein yield in the treatment was 98%, i.e. the insulin content had decreased 45% in proportion to the protein.

EXAMPLE 5

Removal of bovine insulin from a whey protein concentrate with a macroporous acrylic-based adsorption resin, Amberlite XAD 7.

XAD 7 adsorption resin was regenerated with 4% NaOH+ 0.09% HCl, rinsed to neutral and packed into a 20-ml column. 20 column volumes (BV), i.e. 400 ml of a fresh whey protein concentrate (protein content 2%) was passed through the column at pH 6.4.

In the treatment, 86% of the bovine insulin was removed from the whey protein concentrate. The protein yield in the treatment was 85%, i.e. the insulin content had decreased 73% in proportion to the protein.

EXAMPLE 6

Removal of bovine insulin from skimmed milk with adsorption resin Amberlite XAD 7 at pH 6.7.

XAD 7 adsorption resin was regenerated with 4% NaOH+ 0.09% HCl, rinsed to neutral and packed into a 20-ml column. 20 column volumes (BV), i.e. 400 ml of skimmed milk (dry matter 9%, protein 35% of the dry matter) was passed through the column at pH 6.7.

In the treatment, 40% of the bovine insulin was removed in proportion to the protein. The test shows than bovine insulin can be removed also from milk, but the degree of insulin removal is lower than in the treatment of whey.

EXAMPLE 7

Removal of bovine insulin from a casein solution with adsorption resin Amberlite XAD 7 at pH 6.7.

XAD 7 adsorption resin was regenerated with 4% NaOH+ 0.09% HCl, rinsed to neutral and packed into a 20-ml column. 20 column volumes (BV), i.e. 400 ml of sodium caseinate solution (dry matter 3%, protein 89% of the dry matter) was passed through the column at pH 6.7.

In the treatment, 50% of the bovine insulin was removed.

EXAMPLE 8

14 l of fresh cheese whey was ultra and dia-filtered at 40° C. using GR81PP membranes (6,000 D cut-off membranes) by a Labstak ultrafilter at a concentration ratio of 6, diluted to starting volume and refiltered at a concentration ratio of 4, i.e. the total concentration ratio was 24. The bovine insulin content was assayed by the RIA and the protein content was assayed from the starting whey and the whey protein concentrate obtained as the end retentate. The starting whey contained 21.2 ng of bovine insulin per g of protein, and the whey protein concentrate obtained after ultra and dia-filtration contained 14.8 ng of insulin per g of protein.

Thus, ultra and dia-filtration reduced the bovine insulin content by 30% in proportion to the protein.

EXAMPLE 9

5.040 kg of whey protein powder made from whey treated in accordance with example 1, 11.423 kg of a vegetable fat mixture, 11.232 kg of purified lactose, 12.260 kg of malto-dextrine (DE 21), 135 g of a vitamin and mineral pre-mixture (containing vitamins A, D, E, K, B1, B2, B6, B12, niacin, folic acid, pantothenic acid, biotin, ascorbic acid, choline, inositol, ferrous gluconate, zinc sulphate, manganese sulphate, sodium selenite, copper gluconate), and 70 g calcium chloride, 300 g calcium phosphate, 65 g magnesium sulphate, 125 g sodium chloride and 620 g potassium citrate were dissolved in 60 liters of water (50° C.). The dry matter content of the mixture was about 40%.

The mixture so obtained was led to a homogenizer (150/50 bar) and dried to powder by a spray drier at drying temperatures of 180/75° C. on a fluidized bed at 70/120/30° C. The composition, appearance and taste of the product were equal to those of a conventional infant formula powder.

What is claimed is:

1. A method of removing bovine insulin from a liquid fat-free proteinous material originating from cow's milk, said process consisting of the steps of:

contacting the liquid fat-free proteinous material originating from cow's milk with a styrene-based or acrylic-based macroporous adsorption resin having a pore size between 50 to 500 Å, the proteinous material having a pH of 2 to 8, at a temperature of less than 65° C., whereby the weight ratio of the proteinous material to be treated to the adsorption resin is at most 100:1, wherein an ultra and dia-filtration treatment of the proteinous material is carried out before adsorption resin treatment.

2. A method of removing bovine insulin from a liquid fat-free proteinous material originating from cow's milk, said process consisting of the steps of:

contacting the liquid fat-free proteinous material originating from cow's milk with a styrene-based or acrylic-based macroporous adsorption resin having a pore size between 50 to 500 Å, the proteinous material having a pH of 2 to 8, at a temperature of less than 65° C., whereby the weight ratio of the proteinous material to be treated to the adsorption resin is at most 100:1, wherein an ultra and dia-filtration treatment of the proteinous material is carried out before said adsorption resin treatment, and concentrating of drying the so obtained liquid material into a protein concentrate.

3. A method of removing bovine insulin from a liquid fat-free proteinous material originating from cow's milk, said process consisting of the steps of:

contacting the liquid fat-free proteinous material originating from cow's milk with a styrene-based or acrylic-based macroporous adsorption resin having a pore size between 50 to 500 Å, the proteinous material having a pH of 2 to 8, at a temperature of less than 65° C., whereby the weight ratio of the proteinous material to be treated to the adsorption resin is at most 100:1, wherein an ultra and dia-filtration treatment of the proteinous material is carried out after adsorption resin treatment.

4. A method of removing bovine insulin from a liquid fat-free proteinous material originating from cow's milk, said process consisting of the steps of:

contacting the liquid fat-free proteinous material originating from cow's milk with a styrene-based or acrylic-based macroporous adsorption resin having a pore size between 50 to 500 Å, the proteinous material having a pH of 2 to 8, at a temperature of less than 65° C., whereby the weight ratio of the proteinous material to be treated to the adsorption resin is at most 100:1, wherein an ultra and dia-filtration treatment of the proteinous material is carried out after said adsorption resin treatment, and concentrating or drying the so obtained liquid material into a protein concentrate.

5. The method as claimed in claim 1, 2, 3 or 4, wherein whey, a whey protein concentrate, skimmed milk or a casein solution is the liquid fat-free proteinous material originating from cow's milk.

6. The method as claimed in claim 5, wherein whey is the liquid fat-free material originating from cow's milk.

7. The method as claimed in claim 1, 2, 3 or 4, wherein the adsorption resin has a pore size between 450 to 500 Å.

8. The method as claimed in claim 1, 2, 3 or 4, wherein the weight ratio of the proteinous material to be treated to the adsorption resin is 10:1 to 40:1.

9. The method as claimed in claim 1, 2, 3 or 4, wherein the proteinous material is introduced through a column, filled with an adsorption resin, at a flow rate of 1 to 20 column volumes (BV)/h at a temperature of 2 to 30° C.

10. The method of claim 9, wherein the flow rate is 6 to 8 BV/h.

11. The method of claim 9, wherein the temperature is 2 to 10° C.

12. The method as claimed in claim 1, 2, 3 or 4, wherein the proteinous material is contacted with the adsorption resin at a temperature of 2 to 30° C. in a mixing vessel, whereby the contact time under mild mixing is below 2 hours.

13. The method of claim 12, wherein the contact temperature is 2 to 10° C.

14. The method of claim 12, wherein the contact time is 60 minutes.

15. The method as claimed in claim 1, 2, 3 or 4, wherein the liquid fat-free proteinous material originating from cow's milk is ultra and dia-filtered using 5,000 to 25,000 D cut-off membranes, before bringing the proteinous material into contact with the adsorption resin and/or after the absorption resin treatment.

16. The method as claimed in claim 1, 2, 3 or 4, wherein the liquid fat-free proteinous material originating from cow's milk if pretreated by clarifying it before bringing it into contact with the adsorption resin.

17. The method of claim 16, wherein clarifying is by microfiltration using 0.05 to 1.4 micrometer membranes, ultrafiltration or centrifugation.

18. The method of claim 17, wherein clarification is by microfiltration by 0.1 micrometer membranes.

19. The method as claimed in claim 4, wherein the liquid material, treated with the adsorption resin, is concentrated by ultra and dia-filtration using 5,000 to 25,000 D cut-off membranes.

20. The method of claim 19, wherein the filtration is by 10,000 D cut-off membranes.

21. The method of claim 20, wherein the concentrated liquid material is dried into a powder by spray or freeze drying.

22. A substantially bovine insulin-free, fat-free proteinous material originating from cow's milk prepared by the method of claim 1, 2, 3 or 4.

23. A method of preparing a substantially bovine insulin-free infant formula, nutritive preparation, consumable milk, milk drink, or milk preparation using as a protein part the substantially bovine insulin-free, fat-free, proteinous material, originating from cow's milk, prepared by the method of claim 1, 2, 3 or 4.

24. A method of providing nutrition comprising supplying the substantially bovine insulin-free, fat-free proteinous material, originating the cow's milk, prepared by the method of claim 1, 2, 3 or 4.

* * * * *